J. T. HUCK.
PACKING.
APPLICATION FILED FEB. 27, 1914.

1,118,861.

Patented Nov. 24, 1914.

Inventor
J. T. Huck.

Witnesses
W. R. Smith.
John J. McCarthy

By Victor J. Evans
Attorney

UNITED STATES PATENT OFFICE.

JOHN T. HUCK, OF SAN FRANCISCO, CALIFORNIA, ASSIGNOR OF ONE-HALF TO WARREN J. FLICK, OF SAN FRANCISCO, CALIFORNIA.

PACKING.

1,118,861. Specification of Letters Patent. Patented Nov. 24, 1914.

Application filed February 27, 1914. Serial No. 821,520.

*To all whom it may concern:*

Be it known that I, JOHN T. HUCK, a citizen of the United States, residing at San Francisco, in the county of San Francisco and State of California, have invented new and useful Improvements in Packing, of which the following is a specification.

This invention relates to improvements in packing and has particular application to a pressure controlled packing.

In carrying out the present invention, it is my purpose to provide a pressure controlled packing which will be found especially useful in packing the piston plates of rotary engines so as to eliminate leakage of the motive fluid from the cylinder of the engine.

It is also my purpose to provide a packing of the class described which will embrace the desired features of simplicity, efficiency and durability; which may be readily and quickly installed and which will operate effectively under all conditions.

With the above and other objects in view, the invention consists in the construction, combination and arrangement of parts hereinafter set forth in and falling within the scope of the claims.

Figure 1:
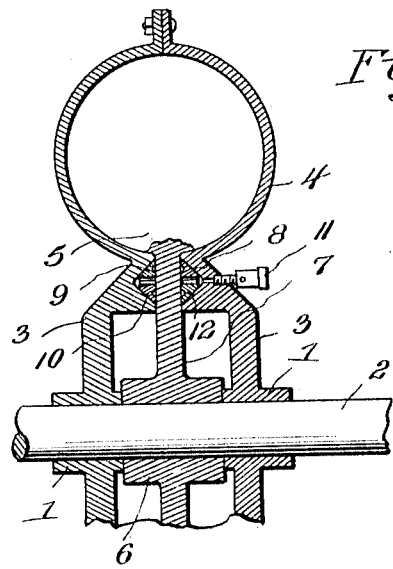
Figure 2:
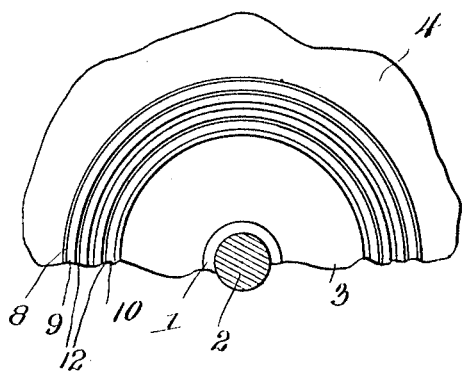
Figure 3:
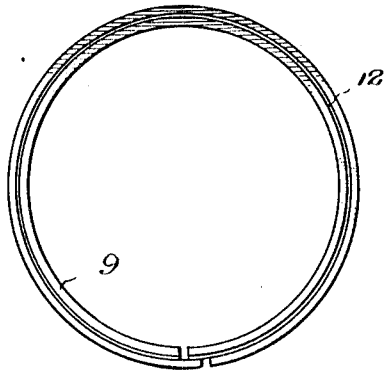

In the accompanying drawing: Figure 1 is a fragmentary transverse sectional view through a rotary engine equipped with a packing constructed in accordance with my present invention. Fig. 2 is a similar view taken at right angles to Fig. 1. Fig. 3 is a view in elevation of one of the packing rings.

Referring now to the drawings in detail, 1, 1 designate horizontally alining bearings supported in some suitable manner, while 2 indicates a shaft journaled in said bearings and capable of rotary motion therein. These bearings are appropriately spaced apart and secured thereto and extending circumferentially thereof are annular spiders 3, 3 having the outer ends thereof connected to and carrying an annular cylinder 4 disposed concentrically of the shaft 2. Mounted within the cylinder 4 and adapted to traverse the same are pistons 5, while keyed upon the shaft 2 between the bearings 1, 1 is a hub 6 equipped with a circumferentially extending piston plate 7 working within a slot formed in the wall of the cylinder 4 at the junction of the latter with the spiders 3. This piston plate is suitably connected with the pistons 5 so that as the latter are revolved within the cylinder 4 under the action of the motive fluid motion will be imparted to the shaft 2 through the medium of the piston plate 7 and hub 6.

Formed in the confronting faces of the slot in the cylinder wall at the junction of the latter with the spiders 3, 3 are substantially V-shaped ways 8 disposed upon opposite sides of the piston plate 7. Within each way 8 are annular packing rings 9, 10 disposed concentrically of each other. The top and bottom faces of the rings 9 and 10 respectively within each way are beveled to conform to the cut of the adjacent sides of the way, while the confronting faces of such packing rings are parallel with each other and spaced apart to form a chamber. By means of this construction, it will be seen that as the motive fluid enters the cylinder 4 to propel the pistons 5 therein a certain portion of such fluid will pass into the ways 8 between the parallel faces of the packing rings and expand against such faces of the rings with the effect to force the latter into engagement with the adjacent walls of the way and piston plate so as to form a fluid tight joint between the cylinder and the piston plate in the operation of the motor. Each way 8 is preferably equipped with a safety valve 11 so as to relieve any excess pressure therein, while the faces of the packing rings in engagement with the piston plate are formed with grooves 12 capable of receiving oil or other lubricating media to facilitate the rotation of the piston plate under the influence of the pistons.

From the foregoing description taken in connection with the accompanying drawing, the construction and manner of employing my invention will be readily apparent. It will be seen that I have provided a packing which will be found especially useful in conjunction with the piston plates of rotary machines or motors and whereby the efficiency of the packing is increased in proportion to the pressure of the motive fluid within the cylinder.

While I have herein shown and described one preferred form of my invention by way of illustration, 1 wish it to be understood that I do not limit or confine myself to the precise details of construction herein described and delineated, as modification and variation may be made within the scope of the claims without departing from the spirit of the invention.

I claim:

1. The combination with a shaft, an annular cylinder disposed concentrically of said shaft and having a slot in the wall thereof, a piston plate secured to said shaft and working within the slot in the wall of said cylinder, pistons within said cylinder and connected to said plate, the opposite walls of said slot being formed with ways at opposite sides of the piston plate, of packing rings disposed within each way and having the confronting faces thereof spaced apart whereby the motive fluid within the cylinder may enter the space therebetween to force said rings into binding engagement with the adjacent walls of the ways and piston plate.

2. The combination with a shaft, an annular cylinder disposed concentrically of said shaft and having a slot in the wall thereof, a piston plate secured to said shaft and working within the slot in the wall of said cylinder, the opposite walls of said slot being formed to provide substantially V-shaped ways, of packing rings disposed within each way and having the confronting faces thereof spaced apart whereby the motive fluid may enter the space therebetween to force the rings into engagement with the adjacent walls of the ways and piston plate.

3. The combination with a shaft, an annular cylinder disposed concentrically of said shaft and having a slot in the wall thereof, a piston plate fixed to said shaft and working within the slot in said cylinder, the opposite walls of said slot being formed with ways disposed at opposite sides of said piston plate, of packing rings within each way and arranged concentrically of one another and having the confronting faces thereof spaced apart whereby the motive fluid may enter the space therebetween to force the same into engagement with the adjacent walls of the ways and piston plate.

4. The combination with a shaft, an annular cylinder disposed concentrically of said shaft and having a slot in the wall thereof, a piston plate fixed to said shaft and working within the slot in said cylinder, the opposite walls of said slot being formed with ways disposed at opposite sides of said piston plate, of packing rings within each way and arranged concentrically of one another and having the confronting faces thereof spaced apart whereby the motive fluid may enter the space therebetween to force the same into engagement with the adjacent walls of the ways and piston plate, and a safety valve connected with each way to release excess pressure therein.

5. The combination with a rotating plate, of a casing having a slot formed therein receiving said plate, the walls of said slot being provided with ways at opposite sides of said plate, packing rings disposed within each way and having the confronting faces thereof spaced apart and adapted to receive a fluid under pressure whereby the packing rings will be forced into engagement with the adjacent walls of the ways and plate.

6. The combination with a rotating plate, of a casing having a slot formed therein receiving said plate, the walls of said slot being provided with ways at opposite sides of said plate, packing rings disposed within each way and having the confronting faces thereof spaced apart and adapted to receive a fluid under pressure whereby the packing rings will be forced into engagement with the adjacent walls of the ways and plate, and a safety valve for relieving the excess pressure in each way.

In testimony whereof I affix my signature in presence of two witnesses.

JOHN T. HUCK.

Witnesses:
W. W. HEALEY,
HAMILTON J. RIGGIN.

Copies of this patent may be obtained for five cents each, by addressing the "Commissioner of Patents, Washington, D. C."